(12) United States Patent
Zhu

(10) Patent No.: US 10,814,921 B2
(45) Date of Patent: Oct. 27, 2020

(54) AUTOMOBILE

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 105 days.

(21) Appl. No.: 16/117,925

(22) Filed: Aug. 30, 2018

(65) Prior Publication Data

US 2018/0362103 A1  Dec. 20, 2018

Related U.S. Application Data

(63) Continuation of application No. PCT/CN2017/111092, filed on Nov. 15, 2017.

(30) Foreign Application Priority Data

Nov. 15, 2016 (CN) .......................... 2016 1 1006001

(51) Int. Cl.
  *B62D 35/02*  (2006.01)
  *B62D 37/02*  (2006.01)
  *B62D 35/00*  (2006.01)

(52) U.S. Cl.
  CPC ........... *B62D 35/02* (2013.01); *B62D 35/007* (2013.01); *B62D 37/02* (2013.01); *Y02T 10/82* (2013.01); *Y02T 10/88* (2013.01)

(58) Field of Classification Search
  CPC ......... B62D 35/02; B62D 37/02; B62D 37/04
  USPC ..... 296/38, 180.1, 181.5; 180/69.1; 280/770
  See application file for complete search history.

(56) References Cited

U.S. PATENT DOCUMENTS

| | | | | |
|---|---|---|---|---|
| 3,776,587 A * | 12/1973 | Oxlade | ................ | B62D 35/02 296/180.5 |
| 4,349,078 A * | 9/1982 | Shimada | ............. | F01N 13/1822 180/69.1 |
| 6,726,273 B2 * | 4/2004 | Kruschhausen | ... | B62D 25/2072 180/69.1 |
| 8,684,446 B2 * | 4/2014 | Zhu | ........................ | B61D 17/02 296/180.1 |
| 9,278,719 B2 | 3/2016 | Zhu | .............................. | 180/903 |
| 9,988,106 B2 | 6/2018 | Zhu | ................................. | 180/2.1 |

* cited by examiner

*Primary Examiner* — Dennis H Pedder
(74) *Attorney, Agent, or Firm* — Stein IP, LLC

(57) ABSTRACT

Disclosed is an automobile, comprising an automobile body, wheels, a suspension device and a spoiler. The path of a fluid flowing through a lower spoiler surface is longer than the path of the fluid flowing through the upper spoiler surface, so that a lift force generated in the driving process of the automobile is reduced or even eliminated. The general understanding that the wheels bear the dead weight of the automobile, loads and all weights generated by the gravitational acceleration is changed. The dead weight of the automobile body is reduced by the lift force generated by the automobile body, the road holding of the automobile is improved after the wheels eliminate the lift force, and thus, the automobile can save more energy and can run more safely.

10 Claims, 2 Drawing Sheets

AUTOMOBILE

CROSS-REFERENCE TO RELATED APPLICATIONS

This application is a bypass continuation of International Application No. PCT/CN2017/111092, filed Nov. 15, 2017, which claims the benefit of priority to Chinese Application No. 201611006001.2, filed Nov. 15, 2016, in the State Intellectual Property Office. All disclosures of the documents named above are incorporated herein in their entireties by reference.

TECHNICAL FIELD

The invention relates to the technical field of vehicle design and manufacturing, in particular to an automobile.

DESCRIPTION OF RELATED ART

As for traditional automobiles, due to the fact that the path of fluids flowing through the upper portion of the automobile body is longer than the path of fluids flowing through the lower portion of the automobile body, a lift force is generated, consequentially, resulting in reduction of road holding and drifting of the automobiles. For over a hundred year, the approach adopted to solve this problem is to overcome the lift force by increasing the weight of the automobiles, but severe energy waste is caused, and thus, further improvements are needed.

The general understanding developed from more than one hundred years since the appearance of automobiles, is that the wheels have to bear the dead weight of the automobiles, loads, and all weights generated by the gravitational acceleration, severe energy waste is caused, and thus, further improvements are needed.

There are two US patents, one of which has the patent number U.S. Pat. No. 9,278,719B2 and the name "Vehicle", and another one of which has the patent number U.S. Pat. No. 9,988,106B2 and the name "Suspension Automobile". Based on the above two patents, the applicant has further obtained the structure of the present invention after many years of efforts.

BRIEF SUMMARY OF THE INVENTION

The technical issue to be settled by the invention is to provide an automobile capable of reducing a lift force in the driving process and also to provide an automobile with an automobile body capable of generating a lift force and wheels capable of eliminating the lift force.

According to one technical scheme adopted by the invention to settle the above technical issue, the automobile comprises an automobile body, a suspension device, a connecting device and a spoiler, wherein the spoiler is connected with the suspension device through the connecting device, and the path of a fluid flowing through a lower spoiler surface is longer than the path of the fluid flowing through an upper spoiler surface.

According to another technical scheme adopted by the invention, the automobile comprises an automobile body, a suspension device, a connecting device, an elastic device and a spoiler, wherein the suspension device is connected with the spoiler through the connecting device, the connecting device is connected with the automobile body through the elastic device, the path of a fluid flowing through a lower spoiler surface is longer than the path of the fluid flowing through an upper spoiler surface, and an upper automobile body part is provided with a flow disturbance face.

The invention has the following beneficial effects. The spoiler is suspended by the suspension device, so that the path of the fluid flowing through the lower spoiler surface made longer than the path of the fluid flowing through the upper spoiler surface, and accordingly, the influence of a lift force generated in the driving process of the automobile on the road holding of tires is reduced or even eliminated, and the safety of the automobile is improved. The invention further provides an energy-saving automobile provided with an automobile body capable of generating a lift force and wheels capable of eliminating the lift force.

REFERENCE SIGNS

Figure 1:
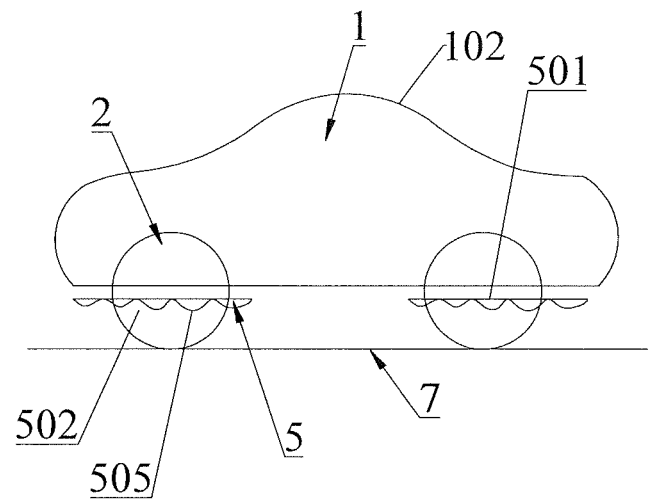
FIG. 1 is a structural side view 1 of the automobile of the invention.

1, automobile body; 2, wheel; 3, suspension device; 4, elastic device; 5, spoiler; 6, connecting device; 7, road surface; 101, lower automobile body part; 102, upper automobile body part; 501, upper spoiler surface; 502, lower spoiler surface; 503, first channel; 504, second channel; 505, flow disturbance face; 601, connecting rod; 602, elastic strip.

DETAILED DESCRIPTION OF THE INVENTION

The technical contents and the objective and effects to be realized by the invention are explained in detail as follows in combination with the embodiments and drawings.

The key conception of the invention lies in that a spoiler is connected with a suspension device and wheels through a connecting device and the path of a fluid flowing through a lower spoiler surface is longer than the path of the fluid flowing through an upper spoiler surface to create a pressure difference, so that the influence of a lift force generated in the driving process of an automobile on the road holding of tires is reduced or even eliminated.

As shown in FIGS. 1-4, an automobile comprises an automobile body, a suspension device, a connecting device and a spoiler. The spoiler is connected with the suspension device through the connecting device. The path of a fluid flowing through a lower spoiler surface is longer than the path of the fluid flowing through an upper spoiler surface.

From the above description, the automobile of the invention has the following beneficial effects. The spoiler is connected with the suspension device, so that the path of the fluid flowing through the lower spoiler surface made longer than the path of the fluid flowing through the upper spoiler surface, and accordingly, the influence of a lift force generated in the driving process of the automobile on the road holding of tires is reduced or even eliminated, and the safety of the automobile is improved.

Furthermore, the spoiler is located between the left wheels and the right wheels at the bottom of the automobile body and/or in the middle of the bottom of the automobile body. The lower spoiler surface is provided with a flow disturbance face. The flow disturbance face comprises concave or convex triangles, trapezoids and/or arcs (see FIG. 4).

Furthermore, a first channel is formed between the upper spoiler surface and a lower automobile body part, a second channel is formed between the lower spoiler surface and a road surface, and the path of the fluid flowing through the second channel is longer than the path of the fluid flowing through the first channel.

Furthermore, the automobile further comprises an elastic device. One end of the elastic device is connected with the automobile body, and the other end of the elastic device is connected with the connecting device. The elastic device is a spring, a hydraulic element or a pneumatic element.

Furthermore, the connecting device comprises a plurality of connecting rods and/or elastic strips and is connected with the spoiler through the plurality of connecting rods and/or elastic strips.

An automobile comprises an automobile body and a suspension device, and is characterized by further comprising a connecting device, an elastic device and a spoiler. The suspension device is connected with the spoiler through the connecting device. The connecting device is connected with the automobile body through the elastic device. The path of a fluid flowing through a lower spoiler surface is longer than the path of the fluid flowing through an upper spoiler surface. An upper automobile body part is provided with a flow disturbance face.

Furthermore, the spoiler is located between the two left wheels and the two right wheels at the bottom of the automobile body and/or in the middle of the bottom of the automobile body.

Furthermore, a flow disturbance face is arranged on the lower spoiler surface and comprises concave or convex triangles, trapezoids and/or arcs. A first channel is formed between the upper spoiler surface and a lower automobile body part. A second channel is formed between the lower spoiler surface and a road surface. The path of a fluid flowing through the second channel is longer than the path of the fluid flowing through the first channel.

Furthermore, the elastic device is a spring, a hydraulic element or a pneumatic element.

Furthermore, the connecting device comprises a plurality of connecting rods and/or elastic strips and is connected with the spoiler through the plurality of connecting rods and/or elastic strips.

From the above description, the connecting device is connected with the spoiler through the plurality of connecting rods or/and elastic strips, and thus, the connection stability of the spoiler is improved.

Embodiment 1

Figure 2:
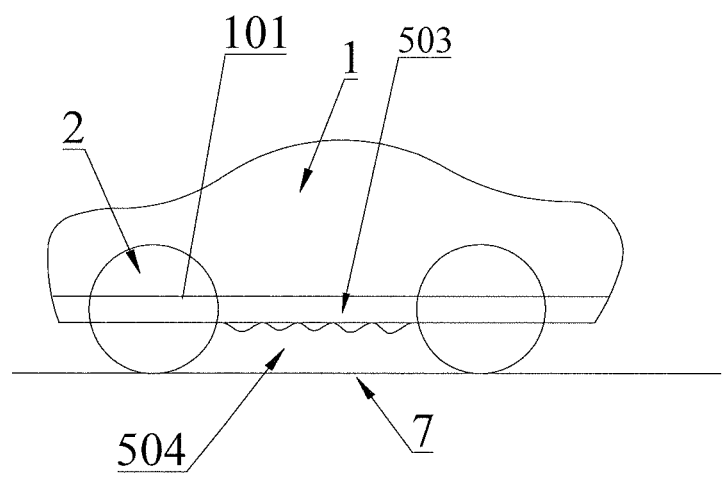
FIG. 2 is a structural side view 2 of the automobile of the invention.
Figure 3:
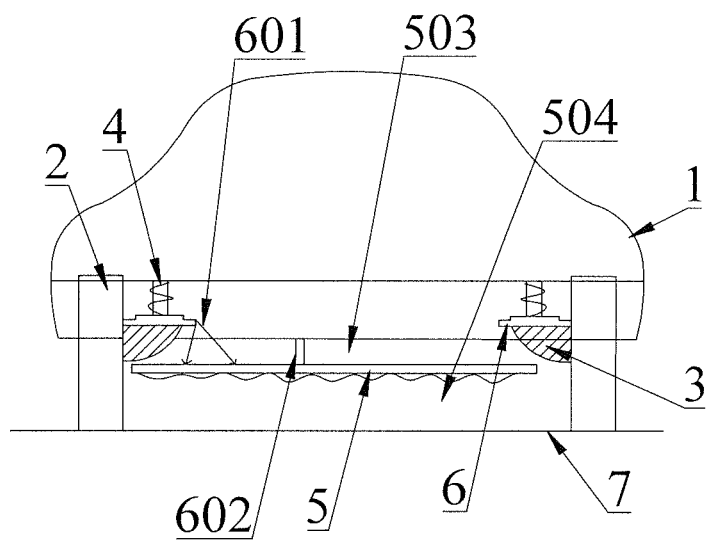
FIG. 3 is a structural rear view of the automobile of the invention.
Figure 4:
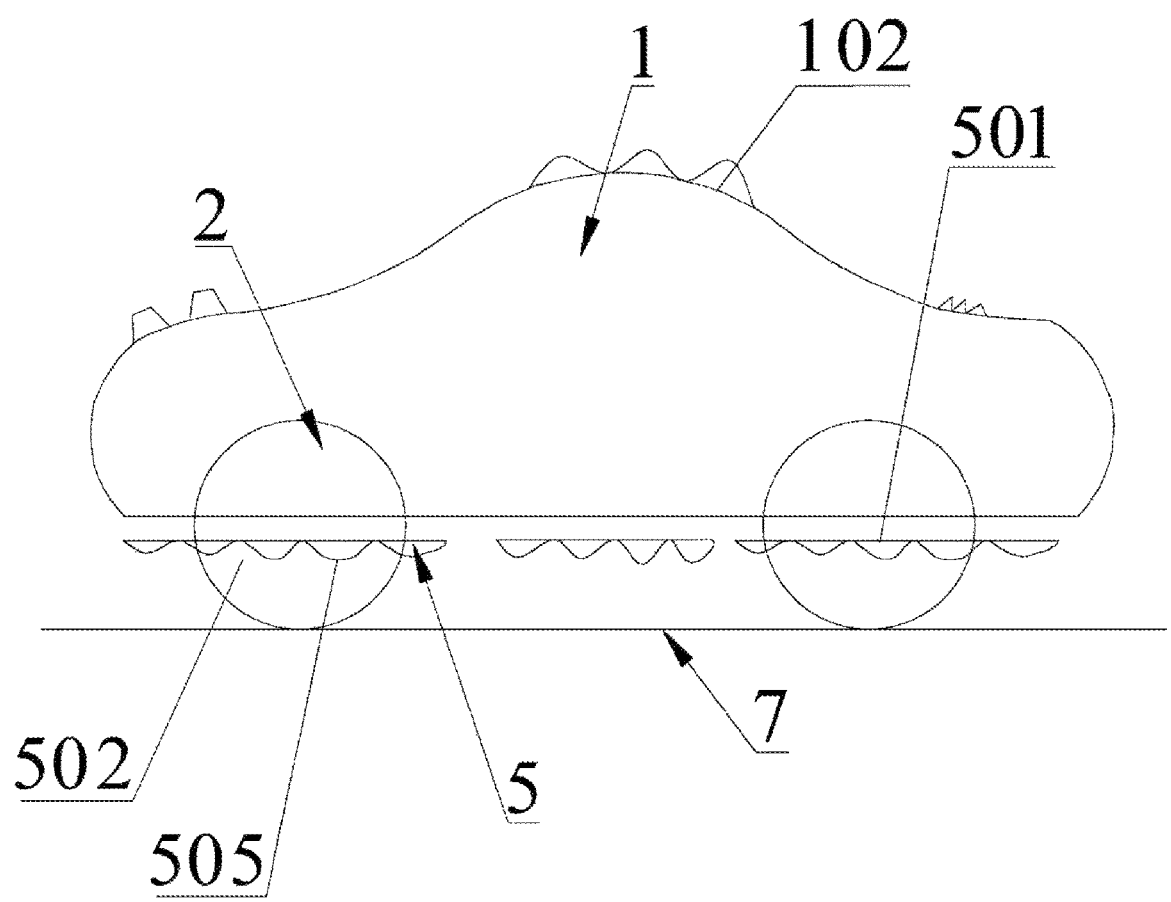
FIG. 4 is a structural side view of the automobile showing a flow disturbance face of different shapes.

As shown in FIGS. 1-3, the automobile comprises an automobile body 1, wheels 2, a suspension device 3 and a spoiler 5. The spoiler 5 is located between the two left wheels 2 and the two right wheels 2 at the bottom of the automobile body 1 and comprises an upper spoiler surface 501 and a lower spoiler surface 502. The upper spoiler surface 501 is a plane. The lower spoiler surface 502 is provided with a flow disturbance face 505. The flow disturbance face 505 is formed by one or more selected from concave or convex arcs, triangles and/or trapezoids distributed on the lower spoiler surface 502, and is used for lengthening the path of a fluid flowing through the lower spoiler surface 502.

Optionally, the upper spoiler surface 501 can also be a flow disturbance face 505 with a small radian as long as the path of the fluid flowing through the lower spoiler surface 502 is longer than the path of the fluid flowing through the upper spoiler surface 501 so as to reduce a lift force generated in the driving process of the automobile.

In this embodiment, a first channel 503 is formed between the upper spoiler surface 501 and a lower automobile body part 101, and a second channel 504 is formed between the lower spoiler surface 502 and a road surface 7. The path of the fluid flowing through the second channel 504 is longer than the path of the fluid flowing through the first channel 503, so that the road holding of the wheels 2 is improved, and the influence of the lift force generated in the driving process of the automobile on the road holding of the wheels 2 is reduced.

As shown in FIG. 3, the wheels 2 and the suspension device 3 are connected with an elastic device 4 through a connecting device 6. The elastic device 4 has an end connected with the connecting device 6 and an end connected with the lower automobile body part 101 and comprises elastic pieces which can be elastic elements such as springs. The elastic device 4 can also be a hydraulic or pneumatic component for achieving flexible connection, which is a common connection manner in this field.

The connecting device 6 comprises at least two connecting rods 601 which are fixedly connected with the spoiler 5. The connecting rods 601 can also be flexibly connected with the spoiler 5 elastically, hydraulically or pneumatically. The connecting device is connected with the spoiler 5 through the multiple connecting rods, so that the connection stability of the spoiler 5 is improved.

In this embodiment, the connecting device 6 further comprises a plurality of elastic strips 602 connected with the spoiler 5. The multiple connecting rods 601 and elastic strips 602 of the connecting device 6 can further improve the stability of the spoiler 5, so that the influence of vibrations generated in the driving process of the automobile on the spoiler 5 is reduced.

In this embodiment, the multiple connecting rods 601 are fixedly connected with the spoiler 5, and thus, the elastic strips 602 can also be removed.

In this embodiment, the connecting device 6 is connected with the spoiler 5 through the connecting rods 601, so that a downward pressure generated in the driving process of the automobile directly acts on the connecting device 6 through the connecting rods 601 and the elastic strips 602 and then directly acts on the wheels 2 connected with the suspension device 3, and accordingly, the upward lift force generated in the driving process of the automobile is reduced or even eliminated, and the road holding of tires is improved, thus, improving the safety of the automobile.

In this embodiment, the spoiler 5 is located between the two left wheels 2 and the two right wheels 2 at the bottom of the automobile body 1, and the area of the spoiler 5 can be increased or decreased as needed. The spoiler 5 can also be located in the middle of the bottom of the automobile body 1; or the spoilers 5 are arranged between the two left wheels 2 and the two right wheels 2 at the bottom of the automobile body 1 as well as in the middle of the bottom of the automobile body 1. The spoiler 5 can correspond to the total area of the bottom of the automobile and can be locally or globally arranged as needed.

Embodiment 2

As shown in FIGS. 1-3, this embodiment is different from embodiment 1 in that an upper automobile body part 102 is locally or entirely provided with a flow disturbance face 505 for lengthening the path of a fluid flowing through the upper automobile body part 102 (not shown), so that a lift force is generated due to the different paths of the fluid flowing through the upper automobile body part 102 and the lower automobile body part 101 of the automobile body 1.

The lift force generated in the driving process of a common automobile due to different flow velocities on the upper part and the lower part of the automobile may reduce the road holding of the wheels, and consequentially, the safety cannot be ensured. However, the automobile of the invention has the following differences:

1. The upper automobile part 102 is provided with the flow disturbance face 505 to lengthen the path of the fluid flowing through the upper automobile part 102, so that a greater lift force is generated due to the different flow velocities on the upper part and the lower part of the automobile body 1.

2. The wheels are connected with the spoiler 5 through the suspension device 3 and the connecting device to reduce or eliminate the lift force, so that the road holding of the automobile is improved, and the automobile can save more energy and can run more safely.

The seemingly-contradictory structure so designed that the automobile body generates a lift force and the wheels eliminate the lift force is reasonably and compatibly applied to the automobile of the invention.

Thus, the general understanding developed in more than one hundred years since the appearance of automobiles, that the wheels bear the dead weight of the automobiles, loads, and all weights generated by the gravitational acceleration is changed.

The wheels 2 of a traditional automobile are connected with a suspension device 3, the suspension device 3 is in turn connected with an automobile body 1 through an elastic device 4, and under this configuration, a lift force is generated in the driving process of the automobile due to different flow velocities on the upper part and the lower part of the automobile.

The wheels of the traditional automobile also generate a lift force in the driving process due to the different flow velocities on the upper part and the lower part of the automobile.

Different from the traditional automobile, the automobile of the invention is provided with the connecting device 6 arranged between the suspension device 3 and the elastic device 4. The connecting device 6 comprises the connecting rods 601 and the elastic strips 602 and is connected with the spoiler 5 through the connecting rods 601 and the elastic strips 602, so that a downward pressure generated due to different flow velocities on the upper surface and the lower surface of the spoiler 5 directly acts on the connecting device 6 through the connecting rods 601 and the elastic strips 602 and then directly acts on the wheels 2 connected with the suspension device 3, and thus, the wheels 2 reduce or even eliminate the lift force below the elastic device 4.

The automobile body 1 and the connecting device 6 are flexibly connected through the elastic device 4, the connecting device 6 is in turn connected with the suspension device 3 and the wheels 2, in this way, the elastic device 4 is connected with the automobile body 1 above and is also connected with the spoiler 5 below through the connecting device 6, the connecting rods 601 and the elastic strips 5, so that the suspension device 3 and the wheels 2 below the elastic device 4 will not be driven to synchronously generate a lift force when the automobile body 1 above the elastic device 4 generates a lift force. Through the flexible connection by the elastic device 4, the dead weight of the automobile body 1 serving as a load space is reduced by the lift force generated by the automobile body 1. The road holding of the automobile is improved after the lift force is eliminated by the wheels 2, and thus, the automobile can save more energy and can run more safely. The seemingly-contradictory structure so designed that the automobile body generates a lift force and the wheels eliminate the lift force is reasonably and compatibly applied to the automobile of the invention.

When the automobile runs, a fluid passes around the automobile, the flow disturbance face 505 is arranged on the lower spoiler surface 502 between the two front wheels and the two rear wheels at the bottom of the automobile, so that the path of the fluid flowing through the lower spoiler surface 502 is longer than the path of the fluid flowing through the upper planar spoiler surface 501, the path of the fluid flowing through the first channel 503 is shorter than the path of the fluid flowing through the upper automobile body part 102 provided with the flow disturbance face 505, and thus, an upward lift force is definitely generated due to the different paths of the fluid respectively flowing through the upper part and the lower part of the automobile body 1.

Meanwhile, the path of the fluid flowing through the second channel 504 formed between the lower spoiler surface 502 and the road surface 7 is longer than the path of the fluid flowing through the first channel 503 formed between the upper spoiler surface 501 and the lower automobile body part 101, and the automobile body 1 is flexibly connected with the spoiler 5 through the elastic device 4, so that the automobile body 1 generates an upward lift force while the wheels 2 reduce or eliminate the lift force, and thus, the automobile can run more safely.

In this embodiment, the spoilers 5 are arranged between the left front wheel and the right front wheel of the automobile as well as between the left rear wheel and the right rear wheel of the automobile, the size and area of the spoilers 5 are set as needed. A downward pressure difference generated due to different flow velocities on the upper surfaces and the lower surfaces of the spoilers 5 directly acts on the wheels 2, and thus, a downward pressure is generated by the wheels 2 to reduce or eliminate the lift force.

Optionally, the spoiler 5 can also be arranged only in the middle area of the bottom of the automobile; or the spoilers 5 are arranged between the two left wheels and the two right wheels at the bottom of the automobile as well as in the middle area of the bottom of the automobile.

In this embodiment, under the premise that the path of the fluid flowing through the upper automobile body part 102 is about equal to the path of the fluid flowing through the lower automobile body part 101, the automobile body 1 generates an upward lift force to suspend, while the wheels eliminate the lift force. Thus, through reasonable design of the flow disturbance face 505, the path of the fluid flowing through the upper automobile body part is made about equal to the path of the fluid flowing through the lower automobile body part, so that the automobile body 1 generates an upward lift force to suspend, while the wheels 2 eliminate the lift force.

When the automobile runs at a high speed, the automobile body 1 generates an upward lift force so as to be partially or entirely suspend. The so-called suspension automobile of the invention does not refer to that the automobile runs by rising away from the road surface by a certain distance, but refers to that the weight of the automobile is reduced in the driving process by changing the downward gravity distribution condition formed by the weight of the traditional automobile based on the fact that the upward lift force will undoubtedly reduce the downward gravity generated by the dead weight of the automobile body 1. Power consumption of the automobile depends on the weight of the automobile, and power consumption of the automobile in the driving process is naturally reduced along with the weight reduction of the automobile. The greater the difference between the paths of the fluid respectively flowing through the upper part and the lower part of the automobile body 1, the greater the lift force, more downward gravity is overcome, and more energy is saved.

Due to the fact that the large-area spoiler 5 at the bottom of the automobile is connected with the connecting device 6 through the connecting rods 601, vibrations can be generated when the automobile runs. To eliminate the vibrations generated by the spoiler 5, the spoiler 5 can also be connected with the connecting rods 601 through a plurality of elastic strips 602, or the elastic strips 602 are connected with the lower part of the automobile body 1, wherein the elastic strips 602 are non-rigid flexible connecting devices such as springs, hydraulic elements or pneumatic elements. Meanwhile, through the flexible connection by the elastic strips 602, the spoiler 5 will not be driven by the lift force generated by the automobile, and accordingly, the wheels 2 will not be driven to synchronously generate a lift force.

In this embodiment, the multiple connecting rods 601 are fixedly connected with the spoiler 5, and thus, the elastic strips 602 can also be removed.

The energy-saving principle of the energy-saving automobile of the invention is as follows: As the whole load space, the automobile body 1 is very heavy; on the contrary, the wheels 2 are light; the dead weight of the load space is reduced by the lift force generated by the automobile body 1, while the light wheels 2 reduce or eliminate the lift force generated in the driving process of the automobile.

In this embodiment, the upper automobile body part 102 is locally or entirely provided with the flow disturbance face 505, so that a greater pressure difference is generated between the upper automobile body part and the lower automobile body part in the driving process, accordingly, a greater lift force is generated, and thus, the automobile can better run in a suspension manner.

In this embodiment, the upper spoiler surface 501 can also be provided with a flow disturbance face 505 under the condition where the path of the fluid flowing through the upper spoiler surface 501 is shorter than the path of the fluid flowing through the upper automobile body part 102, which means that the path of the fluid flowing through the upper spoiler surface 501 is shorter than the path of the fluid flowing through the lower spoiler surface 502.

In this embodiment, the elastic device 4 is a non-rigid flexible connecting device such as a spring, a hydraulic element or a pneumatic element, and the hydraulic element or the pneumatic element is used for connection, buffering and shock absorption. The connecting rods 601 and the elastic strips 602 can also be non-rigid flexible connecting devices such as hydraulic elements or pneumatic elements.

In this embodiment, the spoiler 5 can also correspond to the total area of the lower part of the automobile and can be locally or globally arranged as needed. Due to the fact that the lower spoiler surface 502 is provided with the flow disturbance face 505, the flow velocity of the fluid flowing through the lower spoiler surface 502 is increased and is about the same as the flow velocity of the fluid passing through the bottom of the automobile, the road holding of the four wheels of the automobile is uniformly improved. The automobile runs by a distance corresponding to one circle of the wheels every time the wheels turn by one circle, energy losses caused by at least partial idling of the wheels under the effect of the lift force of the automobile is avoided, and thus, energy is saved.

The seemingly-contradictory structure so designed that the automobile body generates a lift force and the wheels eliminate the lift force is reasonably and compatibly applied to the automobile of the invention. The principle of the invention is not only applicable to various cars, but also applicable to large automobiles such as buses, minibuses, trucks and container trucks.

In conclusion, the automobile of the invention comprises the automobile body, the wheels, the suspension device and the spoiler. The spoiler is located between the two left wheels and two right wheels at the bottom of the automobile body and/or in middle of the bottom of the automobile body. The path of the fluid flowing through the lower spoiler surface is greater than the path of the fluid flowing through the upper spoiler surface, so that the influence of the lift force generated in the driving process of the automobile on the road holding of the tires is reduced or even eliminated, and accordingly, the safety of the automobile is improved. The automobile body generates a lift force, while the wheels eliminating the lift force, the dead weight of the automobile body is reduced by the lift force, the road holding of the automobile is improved after the lift force is eliminated by the wheels, and thus, the automobile can save more energy and can run more safely.

The above description is only used for explaining the embodiments of the invention and is not used for limiting the patent scope of the invention. Any equivalent transformations based on the contents in the specification and the drawings, or direct or indirect applications of the invention to relevant fields should fall within the patent protection scope of the invention.

The invention claimed is:

1. An automobile, comprising:
   an automobile body;
   a suspension device;
   an elastic device;
   a connecting device;
   wheels; and
   a spoiler;
   wherein
   a face of an upper end of the elastic device is connected to a lower part of the automobile body, and a face of a lower end of the elastic device is sequentially connected to the spoiler, the suspension device and the wheels through the connecting device, so that the automobile body generates a lift force and the wheels eliminate a lift force in a driving process of the automobile;
   the automobile body above the upper end face of the elastic device generates a pressure difference and a lift force due to a difference in flow velocity between a upper part of the automobile body and the lower part of the automobile body of the automobile in a driving process;
   the upper part of the automobile body is locally or entirely provided with a flow disturbance face, so that a greater pressure difference and a greater lift force are generated due to a difference in flow velocity between the upper part of the automobile body and the lower part of the automobile body of the automobile in a driving process; and
   a lower surface of the spoiler is provided with a flow disturbance face, and a path of a fluid flowing through the lower surface of the spoiler is longer than a path of the fluid flowing through an upper surface of the spoiler, so that a downward pressure generated by the spoiler acts on the wheels connected with the suspension device through the connecting device, and accordingly, the lift force is reduced or eliminated in a driving process.

2. The automobile according to claim 1, wherein the spoiler is located between left ones and right ones of the wheels at the lower part of the automobile body and in a middle region of the lower part of the automobile body.

3. The automobile according to claim 1, wherein the flow disturbance face of each of the upper part of the automobile body and the lower surface of the spoiler comprises at least one of concave triangles, convex triangles, concave trapezoids, convex trapezoids, concave arcs or convex arcs, and thus a path of a fluid flowing is extended.

4. The automobile according to claim 1, wherein a first channel is formed between the upper surface of the spoiler and the lower part of the automobile body, a second channel is formed between the lower surface of the spoiler and a road surface, so that a path of the fluid flowing through the second channel is longer than a path of the fluid flowing through the first channel.

5. The automobile according to claim 1, wherein the elastic device is one of a spring, a hydraulic element or a pneumatic element.

6. The automobile according to claim 1, wherein the connecting device comprises at least one of a plurality of connecting rods or elastic strips.

7. The automobile according to claim 1, wherein the spoiler is located between left ones and right ones of the wheels at the lower part of the automobile body.

8. The automobile according to claim 1, wherein the spoiler is located in a middle region of the lower part of the automobile body.

9. The automobile according to claim 1, wherein the spoiler is provided corresponding to substantially a whole lower part or part of the lower part of the automobile body.

10. The automobile according to claim 1, wherein the automobile body is provided above the elastic device, and the wheels are provided below the elastic device, and when the automobile body above the elastic device generates a lift force, the wheels are flexibly connected by the elastic device, so that the spoiler generates downward pressure to act on the wheels to eliminate the lift force.

\* \* \* \* \*